May 12, 1931.  J. A. BURTCH  1,805,074
RADIO TESTING DEVICE
Filed May 22, 1925
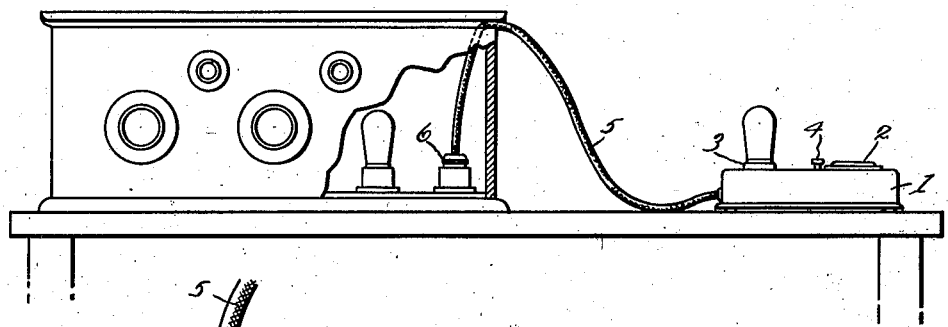
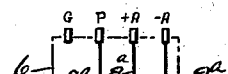
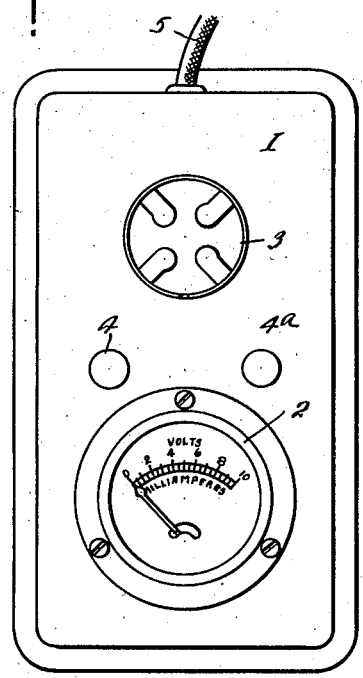
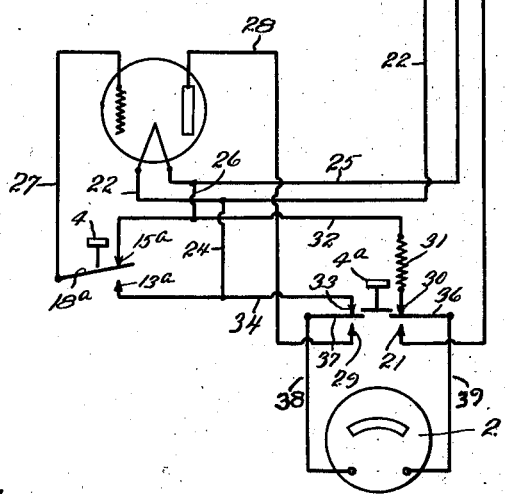

Patented May 12, 1931

1,805,074

UNITED STATES PATENT OFFICE

JOEL A. BURTCH, OF CLEVELAND, OHIO, ASSIGNOR, BY MESNE ASSIGNMENTS, TO JEWELL ELECTRICAL INSTRUMENT COMPANY, A CORPORATION OF ILLINOIS

RADIO TESTING DEVICE

Application filed May 22, 1925. Serial No. 31,999.

This invention relates to testing devices for radio apparatus and is directed more particularly to a device for testing vacuum tubes and the circuit wherein such tubes are used.

The primary object of the present invention is to provide a portable testing device which may be easily and quickly connected with a vacuum tube socket in a radio receiving set and which shall be capable of indicating the condition of the vacuum tube and also capable of indicating if the correct connections have been made in the receiving circuit.

Another object is to provide a device of this general character which shall be simple and compact in construction, inexpensive to manufacture and which shall be highly efficient in use.

A further object is to provide a testing device which shall be constructed in such manner as to render it impossible for even inexperienced persons to connect the same incorrectly hence eliminating all danger of damage to the tubes or other apparatus.

With these and other objects in view the invention consists in the various novel features of construction and arrangement or combination, all of which will be fully described hereinafter and pointed out in the appended claims.

In the drawings accompanying and forming a part of this application, Fig. 1 is a side elevation of my device showing the same operatively connected with a radio receiving set, a portion of such set being broken away for purposes of illustration; Fig. 2 is a top plan view of the device; Fig. 3 is a diagrammatic view illustrating the connections for one form of device; and Fig. 4 is a similar view illustrating the connections for a modified form of the device.

In carrying out my invention I preferably provide a box-like casing 1 on the top of which is mounted an electrical indicating instrument 2, a vacuum tube socket 3 and a pair of push buttons 4 and 4ª. The electrical indicating instrument may be a milliammeter or it may be a combined voltmeter and milliammeter having a single scale graduated to read over a range such as commonly encountered with ordinary vacuum tubes. The electrical indicating instrument, vacuum tube socket and push buttons are electrically connected with each other and with a flexible cable 5 that extends from the casing 1 to a contact plug 6 which is provided with contacts capable of engaging the usual contacts found in a vacuum tube socket. This cable contains three wires 7, 8 and 9 which are connected respectively with the contacts that engage the plate, A positive and A negative contacts of the tube socket.

It should be understood that the term "socket" as used in the specification and claims, is not limited to any particular type of amplifier tube connector, but is generically used to designate all types of connectors adapted to cooperate with the contacts of an electron tube, which contacts are usually, but not necessarily, male contacts. The embodiment which has been chosen to illustrate the invention is, therefore, provided with a tester plug or connector having male contact prongs, adapted to engage the female contacts of a standard tube socket, according to the standard practice, but the type of connectors may be changed or reversed within the scope of the present invention.

Referring now to Fig. 3, wherein the electrical indicating instrument is used only as a milliammeter, it will be noted that wire 7 of the flexible cable 5 is connected through a wire 10 with one terminal of the milliammeter and the other terminal of such milliammeter is connected through a wire 11 with the plate contact spring of socket 3. The wire 8 of such flexible cable is connected through a wire 12 with one of the filament contact springs of socket 3 and also with one of the contacts 13 of a single pole double throw switch which is operated by push button 4. The other wire 9 of the flexible cable 5 is connected through a wire 14 to the other contact 15 of the switch and also through a wire 16 with the other filament contact spring of socket 3. The grid contact spring of socket 3 is connected through a wire 17 with the contact blade 18 of the switch. The push button 4ᵃ and associated switch is omitted from this form of the invention.

In using a device constructed as described above, the operator removes the vacuum tube to be tested, from its socket in the receiving set and places such tube in socket 3 of the testing device. Contact plug 6 is then inserted in the socket in the receiving set from which the tube has been removed. With the set in operation, in the usual manner, the operator notes the reading on electrical indicating instrument 2, such reading denoting the plate current passing through the tube with the grid having the usual negative bias voltage thereon. By depressing push button 4, the grid of the tube is disconnected from the A negative side of the filament battery and is connected with the positive side of such battery thereby placing a positive bias on the grid. It will be understood of course that if the socket in the set has been wired with the A battery connection reversed from that described above, the tube will be connected to the positive side of the A battery with the button in the "up" position and to the negative side when the button is depressed. This will result in an increase in plate current flowing through the tube if the tube is in proper condition and by subtracting the former reading obtained from the milliammeter from such reading obtained by virtue of the positive bias on the grid, the operator is enabled to determine the condition of the vacuum tube. The difference between such readings will of course vary with the plate potential used and in actual practice, a table will be provided with each instrument showing the proper difference for good, medium or poor tubes at various plate potentials. In addition to indicating the condition of the vacuum tube under test, the device will also indicate if the circuit has been properly connected since the device in reality forms a part of the radio receiving circuit and draws the A battery and B battery currents from the same source as the set, and if therefore, faulty connections have been made in the receiving circuit, an improper reading or no reading at all will be obtained.

In Fig. 4 I have shown a diagram illustrating the connections employed with the electrical indicating instrument 2 constructed as a combined milliammeter and voltmeter. In this instance a double pole double throw switch will also be included in the circuit and such switch will be operated by the push button 4ᵃ projecting through the casing similar to push button 4. The plate contact of contact plug 6 is connected as before through a wire 7ᵃ with a contact 21 of the double pole double throw switch. The A positive contact of plug 6 is connected through wire 8ᵃ of the flexible cable with the A positive contact spring of socket 3, through a wire 22, and also through a wire 24 with a contact 13ᵃ of a single pole double throw switch. The A negative contact of plug 6 is connected through wire 9ᵃ of the flexible cable with the A negative contact spring of socket 3 through a wire 25, and also through a wire 26 with the other pole 15ᵃ of the aforementioned single pole double throw switch. The contact blade 18ᵃ of such switch is connected through a wire 27 with the grid contact spring of the vacuum tube socket 3. A wire 28 connects the plate contact spring of tube socket 3 with a contact 29 of the aforementioned double pole double throw switch. The contact 30 of double pole double throw switch 1, which is located opposite contact 21, is connected through a suitable predetermined resistance 31, for purposes of converting a milliammeter into a voltmeter, which in turn is connected through a wire 32 with aforementioned wire 25 that leads to the A negative side of the battery. The other contact 33 of such double pole double throw switch is connected through wires 34 and 24 with the positive side of the A battery leads. The meter terminals are connected to knife blades 36 and 37 through wires 38 and 39 respectively. The double pole double throw switch is preferably so arranged that normally the contact blades 36 and 37 are engaged with contacts 30 and 33 thereby connecting the electrical indicating instrument 2 through resistance 31 with the A positive and negative battery leads; hence the device will indicate the voltage of the A battery circuit. The single pole double throw switch is preferably so arranged that contact blade 18ᵃ is normally in engagement with contact 15ᵃ thereby placing a negative bias on the grid of the tube to be tested.

The device is connected with the receiving set as previously described and the tube to be tested is inserted in socket 3. The rheostat of the receiving set is then adjusted until the electrical indicating instrument 2 shows that the proper voltage is flowing through the A battery circuit. By pressing push button 4ᵃ, the operator automatically disconnects the indicating instrument 2 from the A battery circuit and places it in series with the plate circuit of the vacuum tube. The reading on the instrument 2 will now indicate the plate current flowing through the tube with the usual negative bias on the grid and by depressing push button 4, while still holding button 4ᵃ depressed, the contact blade 18ᵃ is disconnected from contact 15ᵃ and automatically connected with contact 13ᵃ thereby placing a positive bias on the grid of the tube. The indicating instrument 2 will now show a higher reading for the plate circuit and by comparing the difference between the two readings as above described the condition of the tube can be readily ascertained. The modified form of device just described is equally useful for determining if the circuit has been properly wired as above described. The advantage of the modified form of construction shown in Fig. 4 is that the operator is enabled to adjust the filament circuit to the correct voltage by means of the voltmeter connection on the instrument.

An instrument constructed as above described is simple and compact in construction and hence is readily portable. The device can be easily and quickly connected in the circuit by inexperienced persons without danger of burning out the tube to be tested and when so connected will give a relatively accurate indication of the condition of the vacuum tube and also indicate if the receiving circuit is properly connected.

Having thus described my invention, what I claim is:—

1. In a testing device, the combination of a tester plug having plate and filament contacts and adapted to engage the socket contacts of an audion tube circuit, with conductors leading from said plug contacts, an electrical measuring instrument associated with said conductors and plug, an audion tube socket, and switch means for connecting said instrument to measure voltage or current conditions at said tube socket terminals.

2. The method of testing an audion tube circuit having a tube socket, with a combined voltmeter-ammeter instrument having a tube socket, and an audion tube test connector, which comprises, connecting the test connector with one of the sockets of the audion tube circuit, placing an audion tube in the socket of the testing instrument and energizing the plate and filament circuits of said tube, and measuring the voltage and current conditions at the socket of said audion tube circuit with said instrument.

3. In a testing device, the combination of a test connector adapted to be connected to the socket of an audion tube circuit, said connector having a plurality of contacts for engaging the contacts of said socket, a unitary cable having a plurality of flexible conductors leading from said connector contacts, auxiliary audion tube socket contacts energized through said cable conductors, a combined voltmeter and ammeter instrument, and switch means for selectively connecting said instrument to predetermined of said auxiliary socket contacts, to measure the voltage or current conditions existing at the socket of the audion tube circuit.

4. In a testing device for amplifier circuits, the combination of a test connector adapted to engage the socket of an amplifier circuit and having terminals corresponding to the anode and cathode contacts of the socket, for engaging the contacts of said socket, a unitary flexible cable extending from said test connector and comprising flexible conductors leading from said anode and cathode terminals and means for covering said conductors and forming a cable, auxiliary amplifier socket contacts energized through said cable conductors, for receiving the amplifier to be tested with said amplifier circuit, and electrical measuring means for determining the voltage and current conditions between predetermined socket contacts of said amplifier circuit.

5. In a testing device, the combination of a test connector having terminals corresponding to plate and filament contacts, with flexible conductors leading from said contacts, an auxiliary tube connector associated with said conductors and having plate, filament and grid contacts, a circuit connected with said grid contact whereby said grid may be energized from said conductors, a combined voltmeter and milliammeter instrument adapted to indicate electrical conditions at the auxiliary tube connector contacts, and switch means adapted to initially connect said instrument as a voltmeter, for controlling the connection of said instrument, to said auxiliary contacts.

6. A testing device of the character set forth comprising a support having a vacuum tube socket and a combined voltmeter and milliammeter mounted thereon, a contact plug adapted to engage the contacts of a vacuum tube socket of a radio set, flexible leads connecting said plug with said support, a circuit including said leads, first mentioned socket and combined voltmeter and milliammeter, means for connecting the meter in said circuit to indicate either voltage or milliamperes, and means for placing a positive or negative bias on the tube under test.

7. A testing device of the character set forth comprising a box-like casing having a vacuum tube socket, an electrical indicating instrument, and a switch operating element mounted thereon, a contact plug adapted to engage the contacts of a tube socket of a radio set, flexible leads connecting said plug with said casing, a wiring circuit within the casing including said leads, indicating instrument and first mentioned socket, and a single pole double throw switch within the casing and connected in said circuit, said switch being operated by said switch operating element and adapted to connect the grid of the tube under test to a source of positive or negative potential.

8. A testing device of the character set forth comprising a box-like casing having a vacuum tube socket, a meter carried by said casing and capable of indicating voltage and milliamperes, and a pair of switch operating elements carried by said casing, a single pole double throw switch operatively connected with one of said elements, a double pole double throw switch operatively connected with the other of said elements, a contact plug adapted to engage the contacts of a tube socket of a radio set, flexible leads connecting said plug with said casing, and a circuit within the casing including said switches, meter and vacuum tube socket, said circuit being arranged to permit said double pole double throw switch to connect said meter as a voltmeter in the tube filament circuit or as a milliammeter in the plate circuit, and to permit said single pole double throw switch to connect the grid of the tube under test to the positive or negative side of the tube filament circuit.

9. A testing device for use with a remote circuit to be tested including a means for producing the drain or load effect, on a circuit, of a tube in the circuit to be tested, leads from said means arranged for connection to the remote circuit to be tested when a tube is removed therefrom, a meter arranged for connection with certain of said leads thereby permitting the measurement of voltages and current flow in the circuit being tested equal to the voltage and current flow existing therein when the removed tube is in its place.

10. A testing device of the character set forth comprising a support having a vacuum tube socket and a combined voltmeter and milliammeter mounted thereon, a contact plug adapted to engage the contacts of a vacuum tube socket of a radio set, flexible leads connecting said plug with said support, a circuit including said leads, first mentioned socket and combined voltmeter and milliammeter, and means for connecting the meter in said circuit to indicate either voltage or milliamperes.

In testimony whereof, I hereunto affix my signature.

JOEL A. BURTCH.